(12) United States Patent
Pontes

(10) Patent No.: US 9,222,436 B2
(45) Date of Patent: Dec. 29, 2015

(54) AIRFOIL COMBINATION FOR AIRCRAFT TURBOFAN

(76) Inventor: Marcio Carmo Lopes Pontes, Rio de Janeiro (BR)

( * ) Notice: Subject to any disclaimer, the term of this patent is extended or adjusted under 35 U.S.C. 154(b) by 406 days.

(21) Appl. No.: 13/643,448

(22) PCT Filed: Apr. 27, 2011

(86) PCT No.: PCT/BR2011/000122
§ 371 (c)(1),
(2), (4) Date: Oct. 25, 2012

(87) PCT Pub. No.: WO2011/134031
PCT Pub. Date: Nov. 3, 2011

(65) Prior Publication Data
US 2013/0045087 A1 Feb. 21, 2013

(30) Foreign Application Priority Data
Apr. 27, 2010 (BR) ...................... 1001223

(51) Int. Cl.
*F02K 3/06* (2006.01)
*B64C 7/02* (2006.01)
*F02K 1/00* (2006.01)

(52) U.S. Cl.
CPC ... *F02K 3/06* (2013.01); *B64C 7/02* (2013.01); *F02K 1/006* (2013.01); *F05D 2240/12* (2013.01); *Y02T 50/671* (2013.01)

(58) Field of Classification Search
CPC .............. B64C 7/02; B64C 3/32; B64C 1/16; Y02T 50/671; F02K 3/025; F02K 1/006
USPC ................................. 415/108, 142
See application file for complete search history.

(56) References Cited

U.S. PATENT DOCUMENTS

| 3,330,500 | A |   | 7/1967  | Winborn |
|-----------|---|---|---------|---------|
| 3,997,132 | A | * | 12/1976 | Erwin ......................... 244/199.3 |
| 4,205,813 | A | * | 6/1980  | Evans et al. .................. 244/12.5 |

(Continued)

OTHER PUBLICATIONS

International Search Report for International Application No. PCT/BR2011/000122 mailed Oct. 6, 2011.

(Continued)

*Primary Examiner* — Richard Edgar
(74) *Attorney, Agent, or Firm* — KMF Patent Services, PLLC; S. Peter Konzel; Kenneth M. Fagin

(57) ABSTRACT

There is described an airfoil combination for aircraft turbofan, designed to save fuel in aircraft operation, which is composed by two wings (5) and two supports (6) articulated or not, for each of the wings (5). These two wings (5) are located inside the turbofan, internally to the outer fairing (3) of the turbofan and externally to the other components of the turbofan. In one of the embodiments, the two wings may have high-lifting devices, such as flaps. The two wings use the "blown" air at great speed by the fan (1) to generate a predetermined lifting effect pursuant to the flight phases and the operating regimes of the turbofans to compensate totally or partially the weight of the turbofan itself, reducing the lift effort to be generated by the aircraft wings. As the lift force generated by a wing is directly proportional to the square root of the air speed which passes over its surfaces, the lift effect obtained as described above is proportionally very high in relation to the area of the wings (5) that are the subject matter of the present invention.

12 Claims, 5 Drawing Sheets

(56) References Cited

U.S. PATENT DOCUMENTS

| | | | |
|---|---|---|---|
| 4,505,443 A | 3/1985 | Bradfield et al. | |
| 4,506,850 A * | 3/1985 | McConnell | 244/54 |
| 2004/0031258 A1 | 2/2004 | Papamoschou | |

OTHER PUBLICATIONS

Written Opinion of the International Search Authority for International Application No. PCT/BR2011/000122 issued Oct. 6, 2011.

* cited by examiner

AIRFOIL COMBINATION FOR AIRCRAFT TURBOFAN

TECHNICAL FIELD

The present invention refers to systems that generate lift in transport aircraft, diminishing the need for lift generated by the wings of these aircraft, and allowing lesser angles of attack in the various phases of the flight.

Reducing the angles of attack needed results in drag reduction, and in lower fuel consumption, with increased efficiency, reduction in cost and less pollution emission.

The present invention refers to an airfoil combination for aircraft turbofan, designed to reduce the required lift effort generated by the wings of an aircraft having certain weight and speed. The reduction of lift by the wings of the aircraft enables a significant decrease of the effort momentum, resulting in lower resistance to the running of the aircraft, with increased efficiency and reduction of fuel consumption.

BACKGROUND OF THE INVENTION

There are various inventions designed to utilize the efflux of the gases and the air from the turbofans and aircraft turbo jets to generate additional lift, and also to equip the aircraft with the capacity to take off and land on short runways.

One of the current techniques consists of placing the turbofans on the front part of the aircraft wings and in a position such that the efflux of gases and bypass air from the turbofans runs tangentially to the upper surface of the wings. According to this technique, when lift-increasing devices are driven (extended flaps), the efflux of gases from the turbofans is directed downwards, significantly increasing the lift force.

U.S. Pat. Nos. 2,991,961, 4,019,696 and 4,392,621 are based on this technique. One of the drawbacks of this solution consists in the need for placing the turbofans on the front and upper part of the wings, which is not in line with the positioning adopted on the vast majority of commercial aircraft driven by turbofans, in which said turbo-fans are mounted on supports under the wings.

Patent GB 1.071.764 of Jun. 14, 1967 describes a vehicle in which the increase or improvement in lift is obtained by the efflux of jet engine gases on or under the wings of the vehicle, each of the two jet engines being positioned ahead of the front edge of each of the two wings of the vehicle. The vehicle described in patent GB 1.071.764 has a very particular configuration, altogether different from the configuration adopted in the vast majority of commercial aircraft driven by turbofans, in which said turbo-fans are mounted on supports under the wings.

In contrast to the arts described above, the present invention does not require any special positioning of the turbofans, and can be adopted in any configuration of aircraft driven by turbofans, which can be mounted on pylons under or over the wings.

Another technique designed to generate additional lift in aircraft driven by turbofans consists of diverting the air blown by the fan which passes externally to the combustion chamber and direct it through ducts to orifices that release this air tangentially to the upper surface of the wings. This technique is described in patents U.S. Pat. Nos. 4,117,995 and 4,326,686.

The drawbacks of this solution lie in the reduced efficiency of the turbofan as a means of propelling the aircraft during the time in which the air is diverted to generate lift, as described above, in the load losses that occurs when a fluid is diverted from its original path, and in the need to equip the aircraft with ducts and control systems that occupy internal space.

In contrast to the arts described above, the present invention generates additional lift in all the phases of the flight, does not divert the air blown by the turbo-fans from its priority function, which consists of generating propulsion for the aircraft, and does not require any special positioning of the turbofans, and can be adopted in any configuration of aircraft driven by turbofans. It is comprised of few parts, has low weight, and is extremely simple to carry out.

According to the present invention, the arrangement and the location of the aircraft jet engines (turbofans supported by pylons fastened to the wings) is not altered or affected.

SUMMARY OF THE INVENTION

The present invention is designed to reduce the required lift force of the wings of an aircraft, resulting in significant decrease of the effort momentum referred to above, resulting in lower drag, increased efficiency and reduced fuel consumption.

Accordingly, an objective of the present invention is to solve the problems of the state of the art by reducing the angle of attack needed for aircraft driven by turbofans to maintain the lift under any weight, speed and air density condition.

This reduction in angle of attack results in a reduction of aerodynamic drag, with fuel savings, resulting in better yield and efficiency. These savings are even greater in the take-off phase and in the ascend phase of the aircraft up to cruising altitude. In these phases, the fuel consumption is proportionally greater because the aircraft needs an effect of greater lift than its own weight in order to gain altitude.

Another objective is to reduce the need for lift by the horizontal stabilizer of the aircraft, with a reduction of the aerodynamic drag, resulting in greater yield and efficiency for aircraft driven by turbofans.

Another objective of the present invention is to lessen the strain on the wing structures of aircraft, whereby extending the useful life of these structures, with reduction in risk of subsidence accidents of structures, and with reduced maintenance costs thereof.

A further objective of the present invention is to reduce the distances required in take-off and landing of aircraft driven by turbofans, since the present invention increases the lift capacity both on take-off and landing with greater safety.

BRIEF DESCRIPTION OF THE DRAWINGS

In FIGS. 2, 3 and 4, there is represented a vector running perpendicular wise to the longitudinal geometric axis of the turbofan relating to the weight of the turbofan, as well as a representation, in the form of a vector also running perpendicular wise to the longitudinal geometric axis of the turbofan and opposite wise to the vector which represents the weight, relating to the lift force generated by the two small wings 5 that are the subject matter of the present invention.

DETAILED DESCRIPTION OF THE MODES OF EMBODIMENT OF THE INVENTION

Figure 1:
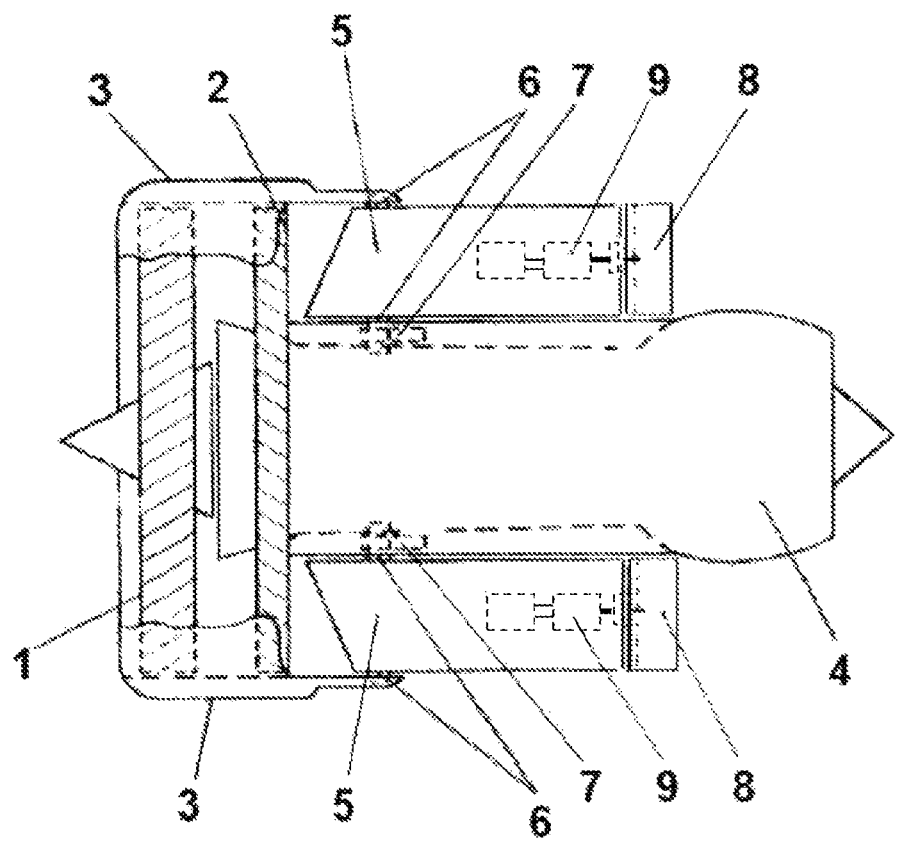
FIG. 1 is a partially cut upper view of the inside of a turbofan illustrating the components of the present invention.

A conventional turbofan is composed by a fan 1, a stator 2, an outer fairing 3, which involves the fan and the stator, and an inner fairing 4, which involves the compressors, the combustion chamber and the turbines. The airfoil combination for aircraft turbofan of the present invention, as illustrated in FIG. 1, additionally comprises two wings 5 and two articulated supports 6, for each of the wings 5.

As it is known, the heavier the total weight (own weight+weight of fuel+weight of load transported) of an aircraft flying at a certain speed, the greater the angle of attack required to obtain the appropriate lift. In turn, the running resistance (drag) tends to augment with the increase in the angle of attack, resulting in higher fuel consumption.

This increase in resistance results from the augmented effort momentum which opposes the advance. The effort momentum is proportional to the aircraft wingspan, and to the value of the aerodynamic drag of each wing section. The value of the aerodynamic drag D is calculated by the formula:

$$D = C_D \times \tfrac{1}{2} p \times V^2 \times S$$

wherein D is the aerodynamic drag force;

$C_D$ is the drag coefficient, which varies according to the wing section, but which considerably increases with the augmentation in the angle of attack;

p is the air density;

V is the speed in feet per second;

S is the area of the wing in square feet.

Since the lift force generated by a wing is directly proportional to the squared speed of the air which passes over its surfaces, the lift effect obtained in the form described above is proportionally very high in relation to the area of the wings 5 that are the subject matter of the present invention.

The two wings 5 are located inside the turbofan, internally to the outer fairing 3 of the turbofan and externally to the other components of the turbofan, such as compressors, combustion chamber and turbines, which will not be detailed here.

Figure 3:
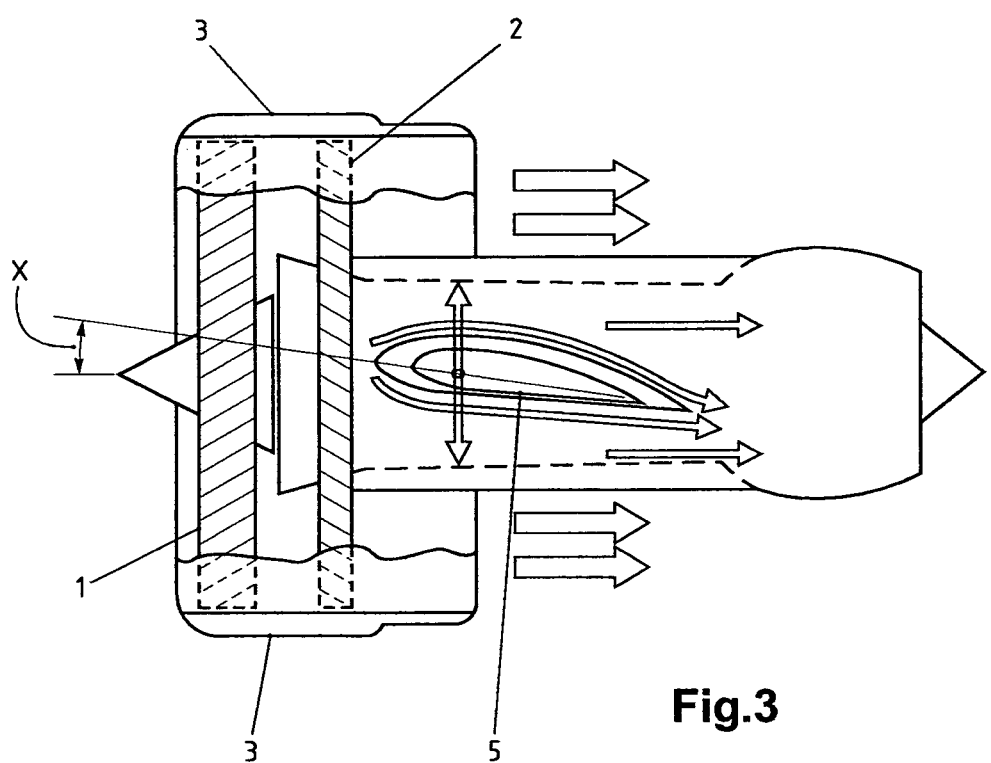
FIG. 3 is identical view to that of FIG. 2, except for the position of the left wing. In this figure, the left wing 5 is forming an angle of attack X with an imaginary line that passes through the longitudinal geometric axis of the turbofan.

As shown in FIGS. 1 and 3, each one of the wings 5 is connected by two articulated supports 6, which fasten each of the wings 5 on the structure of the turbofan, there being provided servo mechanisms 7 (See, e.g., FIG. 1), one for each of the wings 5, which when driven allow the angle of attack X (FIG. 3) of the wings 5 to be changed in relation to the longitudinal geometric axis of the turbofan.

The four supports 6, two for each of the wings 5, are preferably located approximately in the same cross-section of the center of gravity of the turbofan, and approximately in the same cross-section of the location of the center of lift of each of the two small wings 5 that are the subject matter of the present invention.

Figure 2:
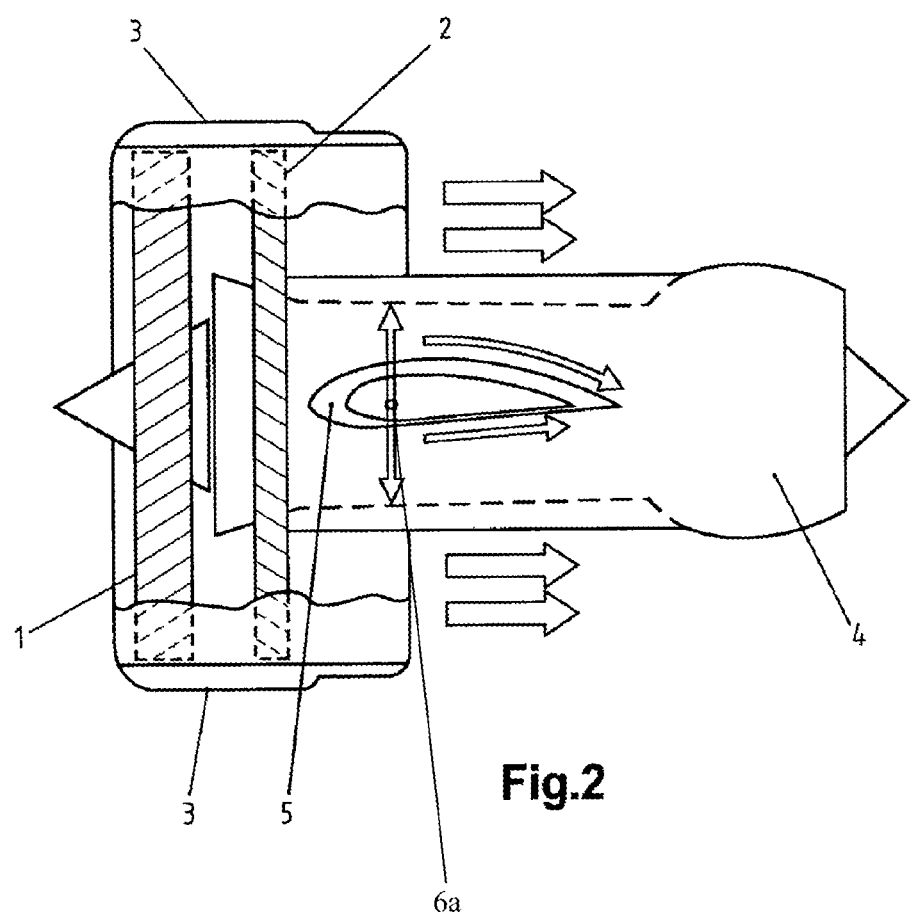
FIG. 2 is a partially cut side view of the inside of a turbofan.

With this device, the wings 5 use the "blown air", the blown air being represented in FIGS. 2 and 3 by arrows with directions substantially parallel to the longitudinal geometric axis of the turbofan, by the fan 1 at great speed to generate a pre-determined lift effect, which is represented in FIGS. 2 and 3 by a direction vector perpendicular to the longitudinal geometric axis of the turbofan, to offset totally or partially the weight of the turbofan itself, the weight being represented in FIGS. 2 and 3 by a vector also perpendicular to the longitudinal geometric axis of the turbofan, but oppositewise to the vector which represents the lift.

The variation of the angle of attack of the wings 5 enables the lift force generated to be adjusted to the various operating regimes of the turbofans.

In another embodiment of the invention (FIG. 2), the airfoil combination is composed of two wings 5 and two non-articulated supports 6a for each of the wings 5. The two wings 5 are located inside the turbofan, internally to the outer fairing 3 of the turbofan and externally to the other components of the turbofan.

In the same way as the prior embodiment, each of the wings 5 is connected to the structure of the turbofan by two non-articulated supports 6a. Accordingly, the wings 5 use the "blown" air, which is represented in FIG. 2 by vectors with directions parallel to the longitudinal geometric axis of the turbofan, by the fan 1 at great speed, to generate a desired lift effect, which is represented in FIG. 2 by a vector perpendicular to the longitudinal geometric axis of the turbofan, to offset totally or partially the weight of the turbofan itself, the weight being represented, in FIG. 2, by a vector perpendicular to the longitudinal geometric axis of the turbofan, but oppositewise to the vector that represents the lift.

In another embodiment of the invention (See, e.g., FIGS. 1 and 4), the airfoil combination is composed of two wings 5, two supports 6 for each of the wings, and a flap 8, one for each of the wings 5. The two wings 5 and their respective flaps 8 are located inside the turbofan, internally to the outer fairing 3 of the turbofan and externally to the other components of the turbofan.

Figure 4:
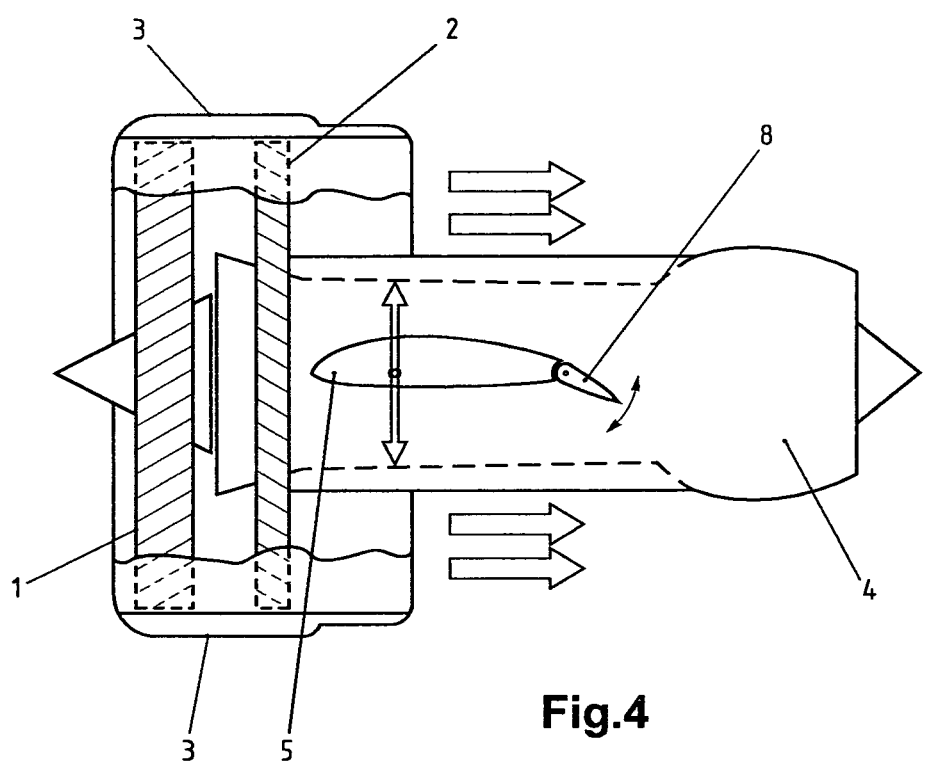
FIG. 4 is a partially cut side view of the inside of a turbofan. In this figure, the wings 5 have high-lifting devices, specifically flaps 8.
Figure 5:
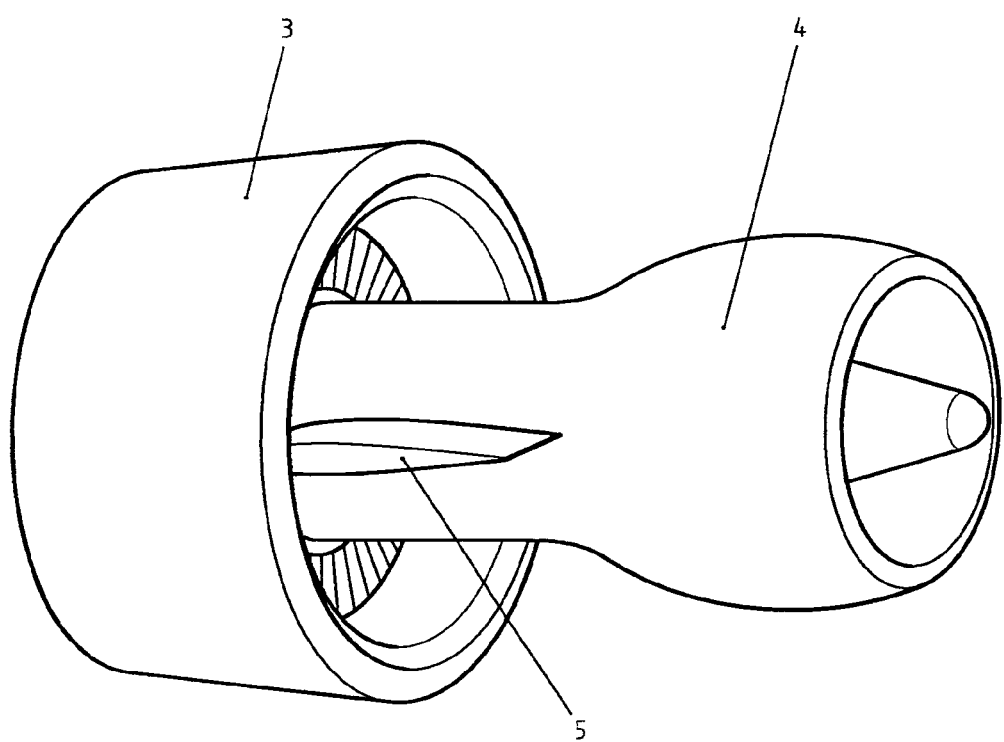
FIG. 5 is a perspective view of the turbofan, with some of the components of the present invention.

Each of the wings 5 is connected to the structure of the turbofan by two supports 6. Accordingly, the wings 5 use the "blown" air, which is represented in FIG. 4 by vectors with directions parallel to the longitudinal geometric axis of the turbofan, by the fan 1 at great speed, to generate a desired lift effect, which is represented in FIG. 4 by a vector perpendicular to the longitudinal geometric axis of the turbofan, to offset totally or partially the weight of the turbofan itself, which is represented in FIG. 4 by a vector perpendicular to the longitudinal geometric axis of the turbofan, but opposite to the vector which represents the lift.

The flaps 8 are driven by servo commands 9 (See, e.g., FIG. 1), which enable their respective slant angles to be altered in relation to the two wings 5, to adjust the effect of lift to the various aircraft flight phases and to the various operating regimes of the turbofans.

Those skilled in the art will note that other devices for modifying the profile of the wings may be used as substitution and/or addition to the flaps exemplified herein.

Now returning to FIG. 2, there is presented a side view of the left wing 5, as well as a vectorial representation of the lift effort generated by the passage of the flow of air over the left wing 5 and which offsets (totally or partially) the weight of the turbofan, represented by a vector oppositewise to the lift effort cited above.

Additionally, FIG. 3 is identical to FIG. 2, except in terms of the position of the left wing 5. In FIG. 3, the left wing 5 forms an angle of attack X with the longitudinal geometric axis of the turbofan.

Additionally, FIG. 4 is a side view of the inside of a turbofan, in which the wings 5 have high-lifting devices, specifically the flaps 8.

The above description of the preferred embodiments is provided so that any person skilled in the art may create or make use of the present invention. Various changes to these embodiments will be readily apparent to those skilled in the art, and the general principles defined herein may be applied to other embodiments without straying from the spirit or scope of the invention. Therefore, the present invention should not be limited to the embodiments illustrated and described herein, but should be in accordance with the broader scope consistent with the principles and characteristics described herein.

The invention claimed is:

1. An airfoil combination for a turbofan, the turbofan comprising:
   a fan,
   a stator,
   an outer fairing receiving the fan and the stator therein, and
   an inner fairing,
   the airfoil combination comprising at least two cambered wings disposed inside the turbofan such that each cambered wing is positioned outside the inner fairing and inside the outer fairing, each cambered wing including an upper wing surface that is more convex than a lower wing surface and positioned within the turbofan so as to generate a pre-determined lift when a fluid is passed thereover.

2. The airfoil combination for a turbofan according to claim 1, wherein each of the cambered wings is provided with at least two articulated supports disposed internally to the external fairing of the turbofan.

3. The airfoil combination for a turbofan according to claim 2, wherein an attack angle of each cambered wing is modifiable relative to a direction of a fluid passed thereover via a servomechanism.

4. The airfoil combination for a turbofan according to claim 1, wherein each of the cambered wings is provided with at least two non-articulated supports provided internally to the outer fairing of the turbofan.

5. The airfoil combination for a turbofan according to claim 1, wherein each of the cambered wings has at least two articulated supports that allow an attack angle of each cambered wing to be modified relative to a direction of a fluid passed thereover.

6. The airfoil combination for a turbofan according to claim 5, wherein the attack angle of each cambered wing is modifiable via a servomechanism.

7. An airfoil combination for a turbofan, the turbofan comprising:
   a fan,
   a stator,
   an inner fairing, and
   an outer fairing receiving the fan and the stator therein,
   the airfoil combination comprising at least two cambered wings each including an upper wing surface that is more convex than a lower wing surface and positioned within the turbofan so as to generate a pre-determined lift when a fluid is passed thereover, each of the cambered wings further including a movable flap such that an angle of each flap relative to its respective cambered wing is movable so as to modify lift that is generated when a fluid is passed thereover.

8. The airfoil combination for a turbofan according to claim 7, wherein each of the cambered wings is provided with at least two articulated supports disposed internally to the external fairing of the turbofan.

9. The airfoil combination for a turbofan according to claim 7, wherein each of the cambered wings is provided with at least two non-articulated supports disposed internally to the external fairing of the turbofan.

10. The airfoil combination for a turbofan, according to claim 7, wherein each of the cambered wings has at least two articulated supports that allow an attack angle of each cambered wing to be modified relative to a direction of a fluid passed thereover.

11. The airfoil combination for a turbofan according to claim 10, wherein the attack angle of each cambered wing is modifiable via a servomechanism.

12. The airfoil combination for a turbofan according to claim 7, wherein the angle of each flap is modifiable via a servomechanism.

* * * * *